United States Patent [19]

Sylvia

[11] 4,438,322
[45] Mar. 20, 1984

[54] CERAMIC COATED ELECTRIC HEATER ASSEMBLY FOR TOOLS

[75] Inventor: Frank Sylvia, Columbia, Md.

[73] Assignee: Pace Incorporated, Laurel, Md.

[21] Appl. No.: 274,224

[22] Filed: Jun. 16, 1981

[51] Int. Cl.³ .................. H05B 3/40; B23K 3/02; H01C 1/148
[52] U.S. Cl. ............................ 219/236; 29/618; 29/619; 219/238; 219/541; 219/544; 228/51; 338/264; 338/275; 338/302; 338/331
[58] Field of Search .............. 219/227, 229, 236–240, 219/541, 544; 228/51–55; 338/262–270, 275, 257, 296, 302, 331, 332; 29/618, 619

[56] References Cited

U.S. PATENT DOCUMENTS

| | | | |
|---|---|---|---|
| 1,407,722 | 2/1922 | Braun | 219/544 X |
| 1,800,688 | 4/1931 | Kebler | 338/265 |
| 1,903,045 | 3/1933 | Hodges | 338/265 X |
| 1,974,302 | 9/1934 | Finlayson | 219/504 X |
| 1,994,994 | 3/1935 | Hampton | 219/239 |
| 2,056,951 | 10/1936 | Bohall et al. | 219/236 |
| 2,761,946 | 9/1956 | Bronstein | 219/239 |
| 2,832,875 | 4/1958 | Norton | 338/264 X |
| 3,248,680 | 4/1966 | Ganci | 338/264 X |

Primary Examiner—A. Bartis
Attorney, Agent, or Firm—Gerald J. Ferguson, Jr.; Joseph J. Baker

[57] ABSTRACT

An electric heater assembly for tools having a removable heated tip includes a tubular metal base having an open end adapted to removably receive and hold the end of the tool tip. A coating of ceramic electrical insulation material is provided on a portion of the exterior of the base and a length of Nickel-Iron alloy resistance wire is wound on the ceramic coated portion. Electrical lead wires are connected in lapped relationship to the respective ends of the resistance wire. Each lead wire includes a first portion lying between several turns of resistance wire and the ceramic coating on the base and a second portion bent back and overlaying the several turns of resistance wire. The second portion is wrapped with at least one additional turn of the resistance wire. A coating of ceramic electrical insulation material is provided over the resistance wire and the terminals to seal the same from the deleterious effects of the atmosphere.

3 Claims, 13 Drawing Figures

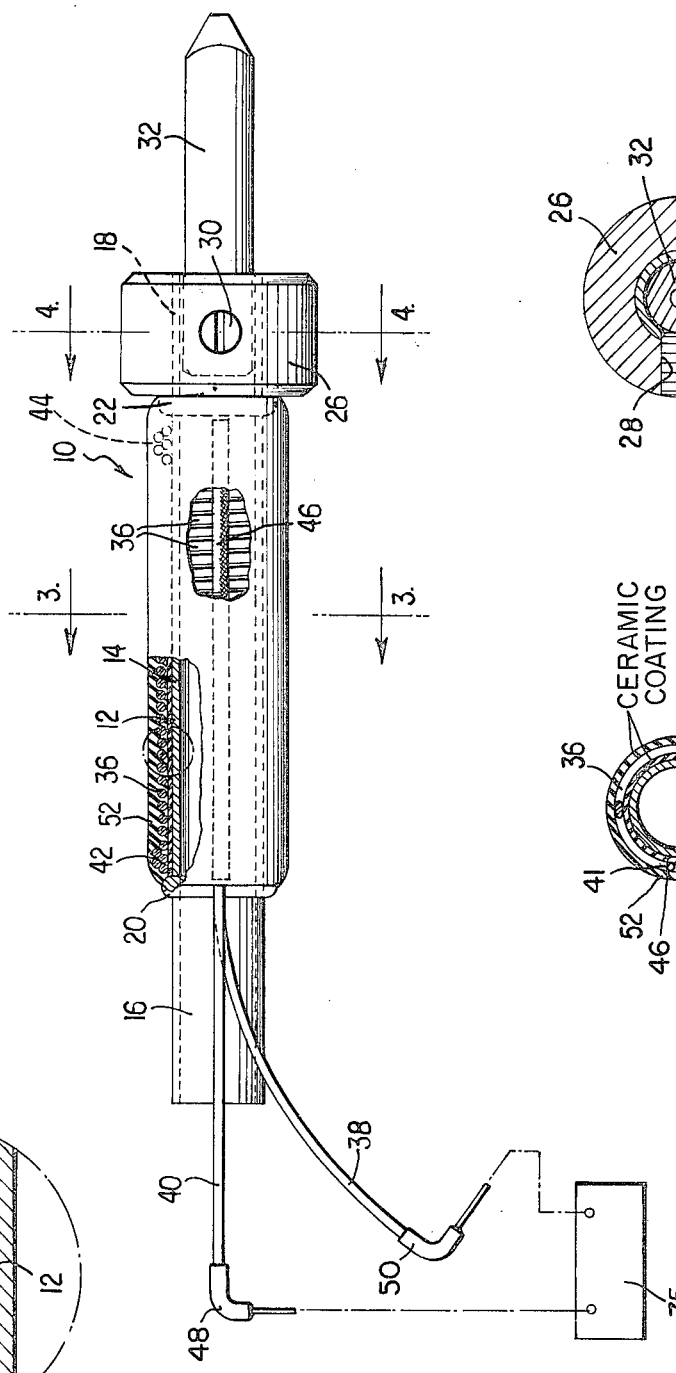
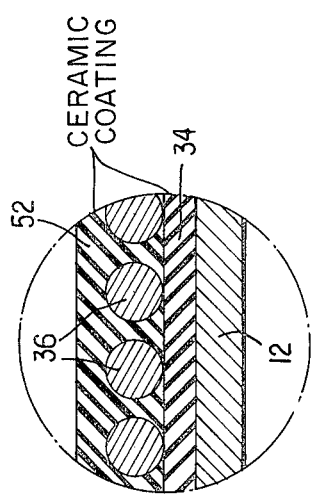
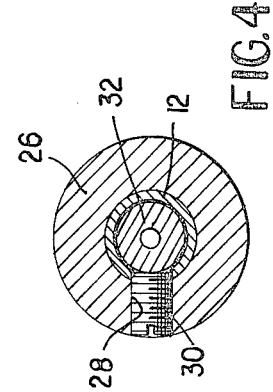

CERAMIC COATED ELECTRIC HEATER ASSEMBLY FOR TOOLS

BACKGROUND OF THE INVENTION

This invention relates to a heater assembly for heated tipped tools and its method of manufacture and more specifically to a heater assembly whose resistance value in ohms remains substantially constant throughout its useful life.

It is well known that the electrical properties of resistance alloy conductors vary with the type of alloy used and that the resistance value changes with temperature. It is also known that the resistance of the assembly will vary with a change in the tension of the wire due to thermal shock or with oxidation that forms in the junction between the resistance wire and the lead conductors supplying current thereto or corrosion of the resistance wire itself. Thus, experiments have shown that the total resistance of such prior art heater assemblies utilizing resistance alloy conductors will vary as a result of one or more of the aforementioned factors.

In order to improve electrical contact and reduce the possibility of oxidation forming in the junction between the resistance wire and the lead conductors, the prior art heater assemblies employed the technique of spot welding the two together. This was generally satisfactory in reducing the effects of oxidation, however, the technical problems of spot welding a fine wire 0.009 inch in diameter, for example, to another wire are significant and require expensive, complex machines requiring operation by skilled workers. No satisfactory solution has been found to the problem of changing resistance due to thermal shock or corrosion of the resistance wire itself. The wrapping of the resistance wire with mica or similar insulating-type material has not been shown to solve these problems.

Such variations in resistance would normally not be of serious consequence in normal soldering iron applications, however, when the heater assembly is used to heat the tips of tools used for delicate, precise soldering or desoldering-type applications where the temperature of the tip must be precisely controlled by electronic circuitry, such variations of the resistance of the heater assembly are intolerable.

In addition, because the temperature controlling circuitry associated with each tool is preset to maintain a specific temperature, consistency of resistance between heater assemblies is essential to enable interchangeability of heater assemblies associated with various types of designs of tips.

Applicant has discovered that by connecting the resistance wire to the lead conductors by a pressure contact or junction resulting from lapping one upon the other several times and surrounding the resistance wire on the heater assembly bobbin as well as the junction between the resistance wire and lead conductors with a coating of insulating material, the junctions are sealed against oxidation, the whole assembly is substantially shock resistant, considerably cheaper, and the overall resistance value remains substantially constant during the life of the assembly in contrast to similar assemblies known in the art as aforementioned which are much more expensive due to the use of complex, expensive machines with skilled operators required when spot welding techniques are used.

It is, therefore, the primary object of the present invention to provide a superior heater assembly for heated tipped tools.

It is another object of the present invention to provide a heater assembly whose resistance value remains substantially constant throughout its useful life.

It is yet another object of the present invention to provide a heater assembly which utilizes a ceramic-type coating to seal the assembly from the deleterious effects of the atmosphere such as oxidation and corrosion to thereby ensure constant resistance.

It is a still further object of the present invention to provide a heater assembly wherein the resistance wire is connected by pressure to the conductor wires to provide a junction which when sealed results in an assembly which is superior yet less expensive than those assemblies utilizing spot-welding techniques at such junctions.

These and other objects and advantages will become apparent to those skilled in the art from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWINGS

FIG. 1 is a side elevational view in partial cross-section of the heater assembly of the present invention.

FIG. 2 is an enlarged view of a portion of the heater assembly encircled in FIG. 1.

FIG. 3 is a cross-sectional view of the heater assembly taken along the lines 3—3 of FIG. 1.

FIG. 4 is a cross-sectional view of the heater assembly taken along lines 4—4 of FIG. 4.

DETAILED DESCRIPTION OF PREFERRED EMBODIMENT

Figure 5:
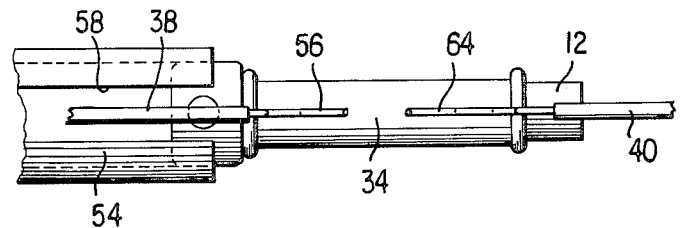
FIG. 5 is a plan view of a portion of the heater assembly secured in a chuck of a winding machine.

Referring now to the drawings wherein like reference numerals designate identical or corresponding parts throughout the several views, FIG. 1 shows the heater assembly 10 of the instant invention. The heater assembly 10 comprises a tubular metal base 12 of stainless steel or the like having a center section 14 to which are adjacent end sections 16,18 separated from the center section 14 by circumferentially extending ribs 20,22 respectively. Ribs 20,22 are integrally formed with the metal base 12.

The end section 18 has a bore 24 through the side thereof and a metal collar 26 positioned thereon and secured thereto. The collar 26 also has a threaded bore 28 which is in registry with bore 24 into which is screwed a set screw 30 for maintaining a hollow desoldering tip 32 or the like within the tubular portion of the metal base 12 and in heat conductive relationship thereto. The other end section 16 is insertable in a handle (not shown) which can be grasped by the hand of the user.

The center section 14 has a coating 34 of insulating and sealing type material placed over the outside surface thereof. The material is preferably ceramic in nature, a typical example of which would be CERAMA-COAT 512* manufactured by Aremco Products, Inc. A winding of heater wire 36 is spirally wound on the ceramic coating 34 in spaced-apart relationship to adjacent turns and is made preferably of a Nickel-Iron alloy having a composition of 70 percent nickel and 30 percent iron. This composition of heater wire 36 was chosen because its resistance varies in a linear manner relative to heat whereas Nickel-Chromium wire, although less susceptible to oxidation, has resistance characteristics which vary greatly with temperature changes. The ends of the heater wire 36 are connected to lead wires 38,40 at terminals 42,44 in a manner to be more fully described later. The lead wire 40 has a portion 41 which extends from one end of the heater assembly over the top of the heater windings 36 to the other end and is insulated from the heater windings 36 by means of a sleeve 46 made of, for example, silicone rubber. The silicone sleeve 46 also extends over the entire length of both lead wires 38,40 to the electrical connectors 48,50 connected to the respective ends thereof. The terminals 42,44 at opposite ends of the center section 14 as well as the entire winding of heater wire 36 and the portion 41 are covered with a coating 52 of the same ceramic material as coating 34 to seal same from the deleterious effects of the atmosphere such as oxidation and corrosion. Such oxidation, etc. forming in the area of the terminals 42,44 would cause variations in the resistance and overall useful life of the heater assembly 10 as aforementioned. The coating 52 eliminates any possibility of such oxidation.
*a trademark of Aremco Products, Inc.

Figure 6:
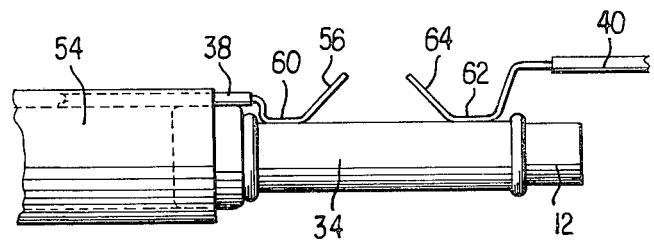
FIG. 6 is a side elevational view of the heater assembly of FIG. 5.

Referring now to FIGS. 5 and 6, the method of making the heater assembly 10 will be described. The tubular base 12 of the heater assembly is shown secured in a chuck 54 of a winding machine (not shown). Prior to winding the heater wire 36 a bare section 56 of lead wire 38 is bent substantially U-shaped and positioned as shown in FIG. 6 so that the remainder of the lead wire 38 extends within a channel 58 formed in the chuck 54 and the curved portion 60 of the bare section 56 rests against the coated surface 34 as will subsequently be described. In addition, after the desired length of winding 36 has been wound on the curved portion 60 to form terminal 42 and on the coated surface 34, the curved portion 62 of the bare section 64 of lead wire 40 is positioned adjacent the coated surface 34 and the terminal 44 is formed as will now be described in detail.

Figure 7A:
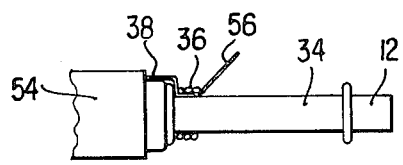
FIGS. 7(a)–7(f) is an illustration of the steps involved in the method of making the heater assembly of the present invention.
Figure 7B:
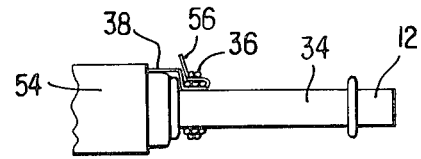
Figure 7C:
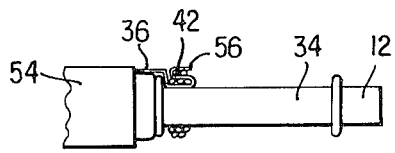

With regard to the actual steps of making the heater assembly 10, after the bare section 56 of lead wire 38 is positioned adjacent the coated surface 34 in the manner shown in FIG. 6, an end of the heater wire 36 is placed in the curved portion 60 and the chuck 54 is rotated so as to wind three turns of the heater wire 36 as shown in FIG. 7(a). The bare section 56 is then bent back over the top of the three turns of heater wire 36 and pressed thereagainst and two more turns of heater wire 36 are wound thereon as shown in the second step shown in FIG. 7(b). The bare section 56 is then bent back over the aforementioned two turns as shown in FIG. 7(c) and the entire lap connection thus formed is pressed together to form the complete terminal 42. The desired number of turns of heater wire 36 (approximately 14) are then spirally wound along substantially the length of the center section 14 in spaced-apart relationship until the proper resistance value is achieved. This can be accomplished by use of an ohmmeter (not shown) connected across the heater wire 36.

Figure 7D:
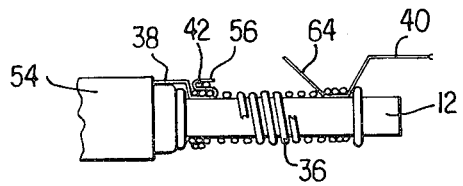
Figure 7E:
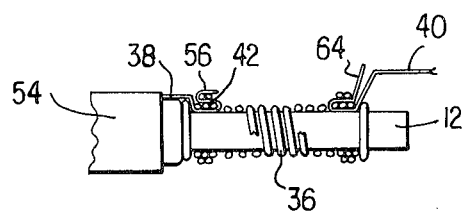
Figure 7F:
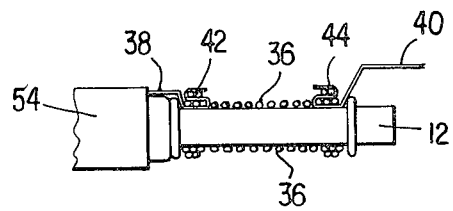

The bare section 64 of lead wire 40 is then positioned adjacent the coated surface 34 as shown in FIG. 6 and three turns of the heater wire 36 is wound in the curved portion 62 as shown in FIG. 7(d). The bare section 64 is then bent back over the three turns and an additional two turns are wound on the bent portion as shown in FIG. 7(e). The bare section 64 is then bent over the two turns, the entire is pressed together to form the complete terminal 44. The lead wire 38 is then bent back adjacent the heater wire 36 to a position substantially adjacent lead wire 40 and the entire assembly consisting of heater wire 36, terminals 42,44 and lead wire 38 are covered with coating 52.

Figure 8:
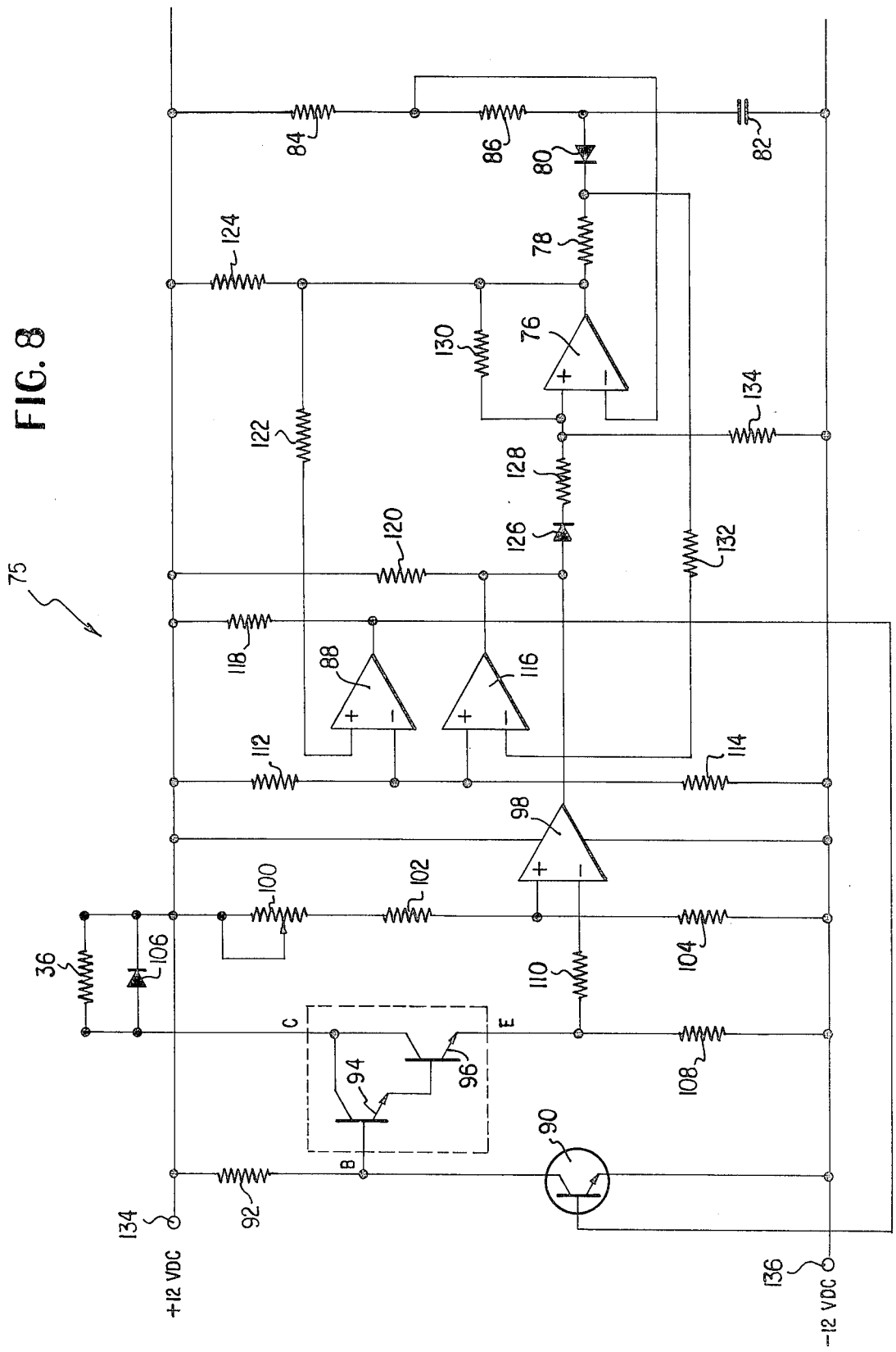
FIG. 8 is a schematic of a control circuit for the heater assembly.

Referring to FIG. 8, there is shown illustrative temperature control circuitry 75. The circuitry for controlling the heating current to and thus the temperature of heating element 36 is such that the heating current is supplied at a high rate when the heating element is below a selected temperature and at a very low rate when it is above the selected temperature. The material employed for heating element 36 has a positive temperature coefficient of resistance and typically varies from about 1 ohm when cold to about 4 ohms when the maximum temperature has been reached, although, of course, other resistance ranges may be utilized. Typically, the heater element material may be a nickel-iron alloy. The circuitry of FIG. 8 senses the change in resistance by sensing the change in current through the heating element to thereby control its temperature. A digital system as opposed to an analog system is employed to thereby lessen power consumption. Accordingly, pulsed power is continuously applied to element 36 to obtain samples of the heater temperature. The sampling is effected by an oscillator comprising a comparator 76, a 10K resistor 78, a diode 80, a 0.027 microfarad capacitor 82 and a voltage divider comprising a 1 megohm resistor 84 and a 100K resistor 86, it being understood the foregoing values are for purposes of illustration.

When heater 36 is raised to its selected temperature, comparator 76 turns off so that its output goes positive. This allows the capacitor 82 to charge through resistors 84 and 86. As capacitor 82 charges positively, the inverting input of comparator 76 becomes more positive. When it becomes more positive than the non-inverting input, the output of comparator 76 goes to ground thereby discharging capacitor 82 through resistor 78 and diode 80, the discharge time being much faster than the charging time.

During the time capacitor 82 is discharging, the output of comparator 76 remains at ground. This causes the non-inverting input of a comparator 88 to be at ground while the inverting input thereof is fixed at typically about 4 volts. Accordingly, the output of comparator 88 is grounded. This, in turn, causes a transistor 90 to be cut off. Accordingly, current flowing through a 200 ohm resistor 92 no longer flows into the base of a transistor 94 where transistors 94 and 96 comprise a Darlington pair which supply current to heating element 110.

If the temperature is high enough so that the inverting input to a comparator 98 remains below the input setting at the non-inverting input thereof, the sampling of the heater temperature will last only until capacitor 82 is discharged. The input setting at the non-inverting input of comparator 98 may be controlled by a potentiometer 100 or it may be fixed by 27K resistor 102 and 1K resistor 104. If, as stated above, the temperature is high enough so that the inverting input to comparator 98 remains below the non-inverting input setting, the inverting input of comparator 76 will become negative and the output will go positive and capacitor 82 will again start charging positive through resistors 84 and 86. The diode 80 prevents positive charging through resistor 78 on the output of comparator 76.

If the temperature is low, the sampling current will be high due to the low resistance of heater element 36. Thus, the inverting input of comparator 98 will be more positive than the non-inverting input thereof and the output will be grounded. This will cause the non-inverting input of comparator 76 to be more negative and the output of comparator 76 will stay negative. Hence, capacitor 82 will not charge positive as long as the inverting input of comparator 98 is more positive than the non-inverting input.

As the temperature of heating element 36 increases, its resistance increases and the current decreases. Eventually, the inverting input of comparator 98 will become negative with respect to the non-inverting input and the output will move positive. This will allow comparator 76 to switch so that its output will be positive and the capacitor will again charge positive. Also comparator 88 will switch so that its output will become positive and turn on transistor 90 so that the power pair 94 and 96 are turned off and no current is supplied to heating element 36. After capacitor 82 is charged to thereby switch comparator 76, another sample will occur and the cycle is repeated.

As can be appreciated, the current through heating element 36 is not switched on or off until the current reaches the input setting established at the non-inverting input of comparator 98. Hence, LED 106 is not switched on and off until the heating element has been raised to its operating temperature. Accordingly, the operator is notified when the desolderer is ready for use by the blinking on and off of LED 106. Although shown conveniently mounted on the handle of the desolderer in FIG. 3, LED 106 can also be mounted on the front panel of the portable power pack (not shown).

Other elements employed in the temperature controller circuitry of FIG. 8 are a 0.1 resistor 108, 2K resistor 110, 200K resistor 112, 100K resistor 114, comparator 116, 10K resistor 118, 10K resistor 120, 100K resistor 122, 10K resistor 124, diode 126, 10K resistor 128, 100K resistor 130, 100K resistor 132 and 200K resistor 134, it again being understood the foregoing values are given for purposes of illustration.

Obviously many modifications and variations of the present invention are possible in light of the above disclosure. It is therefore to be understood that, within the scope of the appended claims, the invention may be practiced otherwise than as specifically described.

What is claimed is:

1. A heater assembly for tools having a heated tip comprising:
    (a) a tubular metal base having an open end adapted to receive and hold the end of a tool tip in heat conductive relationship therewith,
    (b) a coating of insulating material on a portion of the exterior of said base,
    (c) a length of resistance-type wire wound on said coated portion and around said base,
    (d) lead wires connected to respective ends of said resistance wire, each of said lead wires being in lapped relationship to the respective end of said resistance wire and including a first portion lying between several turns of resistance wire and said insulating coating, a second portion overlaying said several turns of said resistance wire, said second portion in turn being wrapped with at least one additional turn of said resistance wire to form a terminal therewith, and
    (e) a coating of insulating material on said resistance wire and said terminal formed at each end of said wire to seal same from the deleterious effects of the atmosphere.

2. A heater assembly as set forth in claim 1 wherein said insulating material is ceramic.

3. A heater assembly as set forth in claim 1 wherein said resistance wire is Nickel-Iron.

* * * * *